(12) United States Patent
Beaudonnet et al.

(10) Patent No.: US 8,262,379 B2
(45) Date of Patent: Sep. 11, 2012

(54) DEVICE AND METHOD FOR PRODUCING A TREAD

(75) Inventors: Christian Beaudonnet, Ravel (FR); Rémi Braunt, Riom (FR); Daniel Bresson, Mozac (FR); Thierry Orsat, Chatel-Guyon (FR)

(73) Assignees: Michelin Recherche et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 118 days.

(21) Appl. No.: 12/746,116

(22) PCT Filed: Dec. 2, 2008

(86) PCT No.: PCT/EP2008/066647
§ 371 (c)(1),
(2), (4) Date: Nov. 17, 2010

(87) PCT Pub. No.: WO2009/071551
PCT Pub. Date: Jun. 11, 2009

(65) Prior Publication Data
US 2011/0062625 A1    Mar. 17, 2011

(30) Foreign Application Priority Data
Dec. 3, 2007  (FR) ...................................... 07 59492

(51) Int. Cl.
*B29C 35/00* (2006.01)

(52) U.S. Cl. ............ 425/19; 425/26; 425/127; 425/113; 425/130; 425/120; 264/36.14; 264/250; 264/255; 264/275; 264/251

(58) Field of Classification Search .................. None
See application file for complete search history.

(56) References Cited

U.S. PATENT DOCUMENTS

| 3,945,417 | A | * | 3/1976 | Harrelson, Jr. ............. 152/209.6 |
| 3,993,521 | A | * | 11/1976 | Harrelson, Jr. ................. 156/96 |
| 4,539,169 | A | | 9/1985 | Nixon |
| 2001/0035255 | A1 | | 11/2001 | Sergel et al. |
| 2004/0191346 | A1 | * | 9/2004 | Marangoni et al. .......... 425/28.1 |
| 2005/0034802 | A1 | | 2/2005 | Shirasaka et al. |

FOREIGN PATENT DOCUMENTS

| EP | 1 433 592 | 6/2004 |
| WO | WO 03/089257 | 10/2003 |
| WO | WO 2006/069912 | 7/2006 |

* cited by examiner

*Primary Examiner* — Edmund H. Lee
(74) *Attorney, Agent, or Firm* — Cozen O'Connor

(57) ABSTRACT

Device for manufacturing the tread of a tire, said tread comprising a plurality of relief tread elements of height h whose radially outer surface is designed to be in contact with the ground when the tire is rolling on the road surface, comprising a rotary support suitable for supporting a base strip (MB) forming a receiving surface (S), an extrusion die (1) comprising a plurality of extrusion nozzles whose outlet channels are oriented radially approximately perpendicular to the receiving surface (S), at least two compound supply means, each feeding into one or more separate extrusion nozzles, and means for positioning and moving the extrusion die relative to the receiving surface (S).

19 Claims, 5 Drawing Sheets

DEVICE AND METHOD FOR PRODUCING A TREAD

RELATED APPLICATIONS

This is a U.S. national stage under 35 USC §371 of application No. PCT/EP2008/066647, filed on Dec. 2, 2008.

This application claims the priority of French application Ser. No. 07/59492 filed Dec. 3, 2007, the entire content of which is hereby incorporated by reference.

FIELD OF THE INVENTION

The invention relates to the manufacture of tires. More particularly, the present invention relates to the problem of the manufacture of tire treads in which each tread block is formed from at least two elastomeric compounds of differing qualities.

BACKGROUND OF THE INVENTION

This type of tire is described by way of example in publication No. WO 03/089257 and publication No. JP 2005/186841. This particular construction is designed to improve, among other things, the tire's performance on wet surfaces without reducing its wear and grip qualities on dry surfaces.

The production of this type of tread requires great care in positioning the materials in a precise and reproducible manner. One process has been proposed and published under No. WO 2006/069912. This process involves injecting insertion compounds at predetermined positions into an uncured base tread using a nozzle, after the end of said nozzle has been pushed into said tread. When introducing the green tire into the press, great care is required to line up the resulting inserts with their corresponding tread motifs.

However, it is observed that this process has certain limits, especially when it comes to making precision mouldings. Movements of the rubber during moulding cause random movements of the insertions of compound. This causes considerable dispersion of the interfaces between the compounds, which in turn limits the number of different compounds that can be injected into a tread element.

SUMMARY OF THE INVENTION

It is an object of the present invention to provide a device and process that will reduce the drawbacks of the method described above, particularly where it is wished to produce relief tread elements comprising a plurality of differing compound qualities.

One aspect of the invention is directed to a device that comprises a rotary assembly suitable for supporting a base strip forming a receiving surface S, an extrusion die comprising a plurality of extrusion nozzles whose outlet channels are oriented approximately perpendicular to the receiving surface, at least two compound supply means, each feeding into one or more separate extrusion nozzles, and means for positioning and moving the extrusion die relative to the receiving surface S.

Another aspect of the invention is directed to a process for manufacturing the tread of a tire using a device as detailed in the preceding paragraph which makes it possible to produce treads comprising a plurality of relief tread elements. Said process comprises the following steps:

preparing a base strip from an uncured elastomeric base compound, acting as a receiving surface, and depositing directly on said strip, at predetermined locations corresponding essentially to the location of the tread elements, by extruding compound through extrusion nozzles, blocks of uncured compound designed to form a relief tread element, each of the blocks being composed of at least two uncured elastomeric compounds of differing qualities.

This gives a tread on which the tread reliefs are visible and are positioned more or less in their final locations. When the green tire is placed in the press, as the relief motifs of the mould advance into the green tread, the relief parts of the mould position themselves directly in the spaces between the blocks of compound. Rubber movements are therefore greatly reduced and are limited to filling the tread impressions. The result is much better precision in the positioning of different compounds within one relief tread element.

BRIEF DESCRIPTION OF THE DRAWINGS

The following description describes one particular device according to an embodiment of the invention and is based on FIGS. 1 to 17.

DETAILED DESCRIPTION OF THE DRAWINGS

Figure 1:
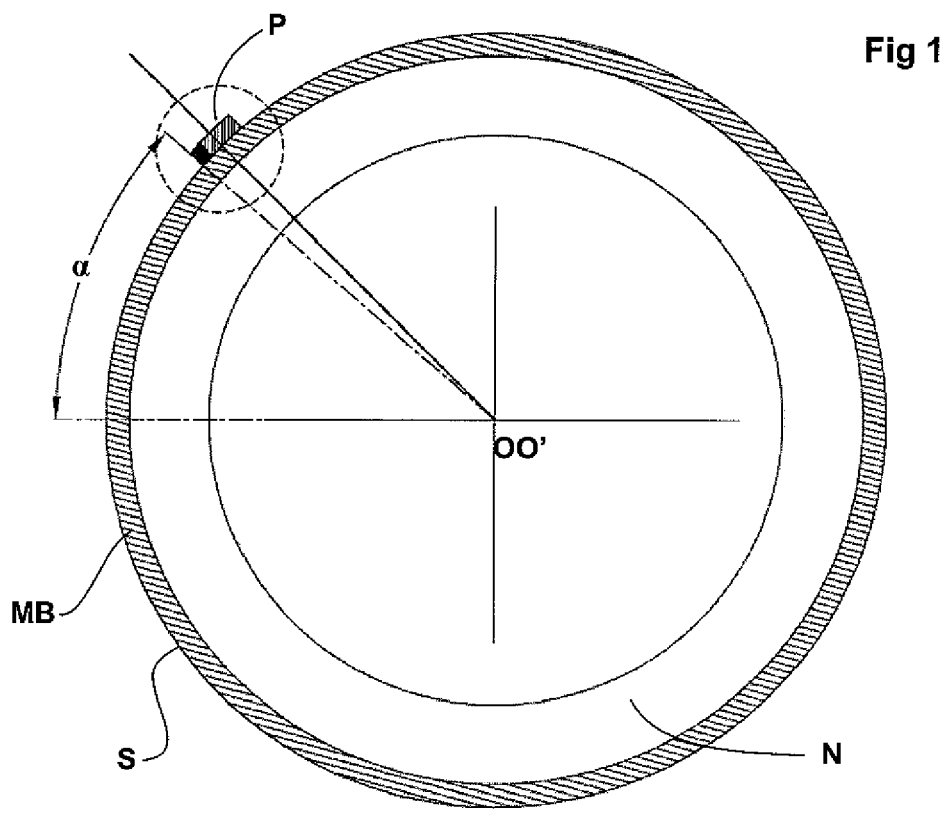
FIG. 1 is a diagrammatic view of a green tire on which a block of compound has been deposited.

FIG. 1 is a diagrammatic cross section through a base strip MB laid on a support M rotating around the transverse axis OO'. A block P has been deposited on the base strip at a very precise predetermined azimuth α. The position of the block P of compound in relation to the azimuth □ and the transverse direction OO' corresponds to the position of a relief element of the tread of the final tire.

The shape of the support M for carrying out the invention may be cylindrical, as in the case of a tire assembly means in which the crown reinforcing plies and the tread are assembled on an independent form, or torus-shaped, when the whole of the green tire is assembled on this form.

It would be perfectly possible to carry out the invention by placing the base strip MB on a flat support. It would then be necessary, at a later stage of manufacture, and after having arranged the blocks of compound on said base strip, to take a length of the base strip and deposit this length on the crown assembly form. It will then be seen that it is difficult to butt-join the two ends of the strip without damaging the blocks of compound located at the precise position where the two ends of the strip are to be welded. In addition, inaccuracies due to applying the length of base strip by a winding process could undo the very effects which the implementation of a method according to the invention is intended to achieve. It will therefore be preferable to use a cylindrical or torus-shaped support on which the base compound is laid in its more or less final position, and which allows precise indexing of the positions of the blocks of compound. The utility of this indexing will be developed in the course of the present description.

Figure 2:
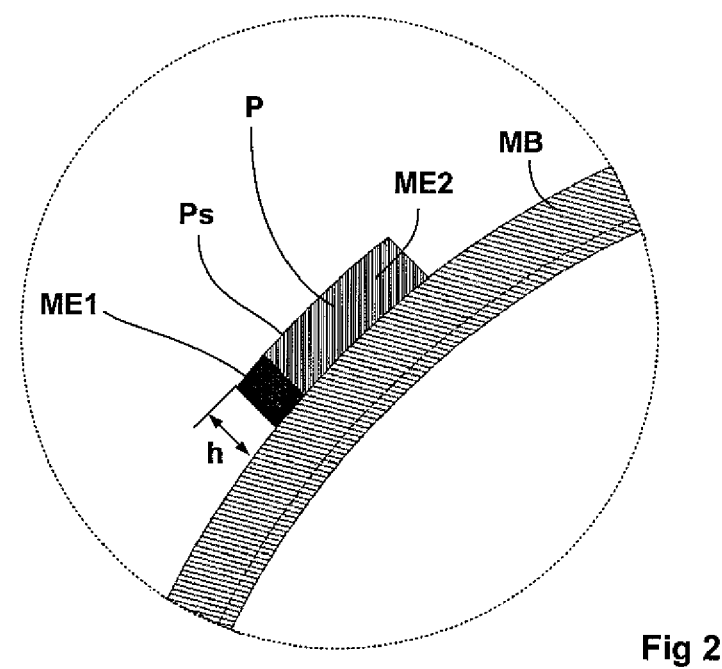
FIG. 2 is a diagrammatic view of said block of compound.

FIG. 2 is a detailed view of the area circled in FIG. 1. The block P is formed by the juxtaposition of two different compounds ME1 and ME2 applied to the surface of the base strip MB. The compounds ME1 and ME2 are uncured, to allow flow of said compounds in the various members of the device during the execution of the method of the invention.

The block P of compound has a height h corresponding approximately to the height of a relief element of the tire tread. The transverse and circumferential dimensions of the block of compound are also controlled with great care to correspond as accurately as possible to the dimensions of the tread element.

The radially outer surface Ps of the block P is roughly the shape of the surface, designed to be placed in contact with the ground when the tire is rolling along the road surface, of the relief tread element to which said block P corresponds. To obtain the above-described effects on the performance of the rolling tire, it should also be observed that each of the compounds is located radially in such a way as to be flush with the level of the surface Ps.

Figure 3:
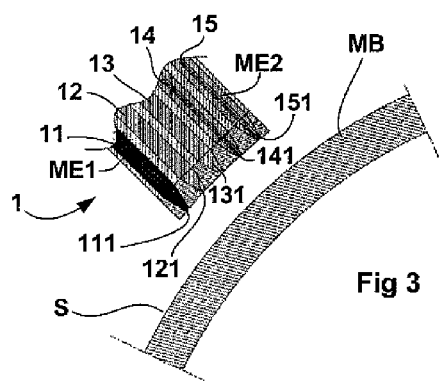
FIGS. 3 to 8 show the various steps in the use of a device according to the invention.

FIGS. 3 to 8 illustrate diagrammatically the various phases in the use of a device according to the invention. FIG. 3 shows diagrammatically an extrusion die 1 formed by the juxtaposition of extrusion nozzles 11, 12, 13, 14 and 15 oriented radially in a direction approximately perpendicular to the receiving surface S. The embodiment of the invention shown in this figure indicates the presence of five individual extrusion nozzles. It goes without saying that this number of nozzles can be increased in the transverse direction or in the circumferential direction without departing from the scope of the invention.

Staying with the example shown in FIG. 3, each nozzle is connected to a compound supply means (not shown) by a supply channel. In the case of the device shown in FIG. 3, the extrusion nozzle 11 is connected to the supply means delivering a compound ME1, and the extrusion nozzles 12, 13, 14 and 15 are connected to the supply means delivering a compound ME2. As will be explained later, it is possible, depending on manufacturing requirements, to devise as many arrangements as necessary and connect the nozzles to two or more individual supply means.

The outlet orifices 111, 121, 131, 141 and 151 are arranged in a plane approximately parallel to the receiving surface S. This is found to be useful if it is desired to produce motifs of blocks in which each of the compounds ME1, ME2 is flush with the surface Ps of the block P.

Provision will also be made to arrange the orifices of the extrusion nozzle outlet channels in such a way that they are inscribed within the area Ps.

Figure 4:
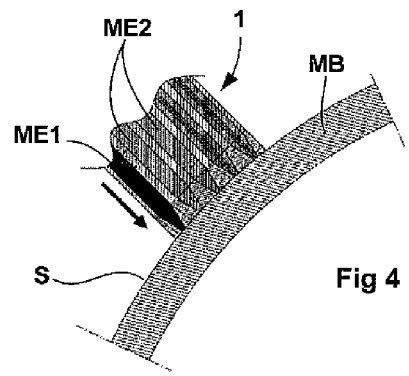

The first step in carrying out the process is to advance the extrusion die so that the outlet orifices are as close as possible to the receiving surface S. FIG. 4 shows the case in which the outlet orifices 111, 121, 131, 141 and 151 of the extrusion nozzles are in contact with the receiving surface.

Figure 5:
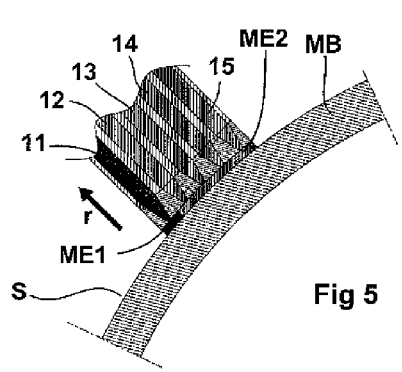

The next step, as illustrated in FIG. 5, is to activate the compound supply means to extrude the compounds ME1 and ME2 through the orifices 111, 121, 131, 141 and 151 of the nozzles 11, 12, 13, 14 and 15. Simultaneously the extrusion die is drawn back radially from the surface in the direction r so that the space between the plane formed by the extrusion orifices and the receiving surface is filled by the compounds ME1 and ME2 emerging from the nozzles. The speed of withdrawal of the extrusion die must be adjusted to the speed with which said space is filled by the extrusion nozzles, so that as far as possible no void can occur between the extrusion nozzle orifices and the radially upper part of the block that is being created.

Figure 6:
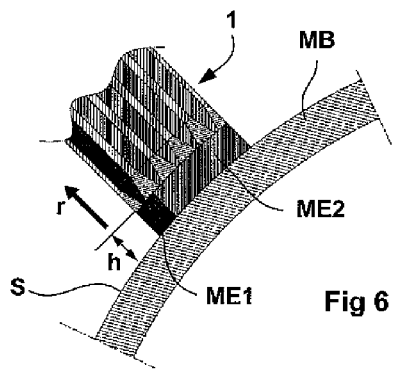
Figure 7:
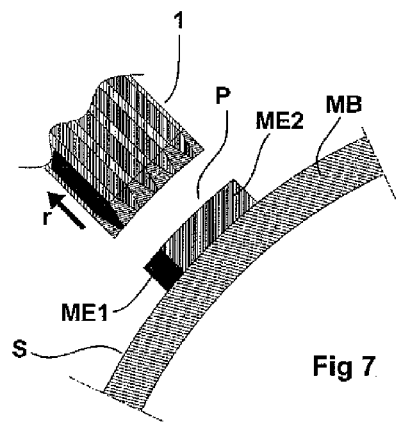

When the extrusion orifices are at a radial height h from the receiving surface, as shown in FIG. 6, the extrusion flow is interrupted.

The radial movement of the extrusion die away from the receiving surface is then continued until the beads of compound exiting the extrusion orifices 111, 121, 131, 141 and 151 break. For this purpose the cross section of the outlet orifices is made significantly smaller than the cross section of the channel of the extrusion nozzle in order to reduce accordingly the cross section of the bead of compound exiting the nozzle. Hence, the smaller the cross section of the outlet orifices, the shorter the distance that must be traveled before the beads break, and the less irregular the surface Ps will be. On the other hand, too small a cross section will tend to result in excessive heating of the compounds during extrusion, especially if it is desirable to increase the flow rate for obvious reasons of accelerating the application cycle.

Figure 8:
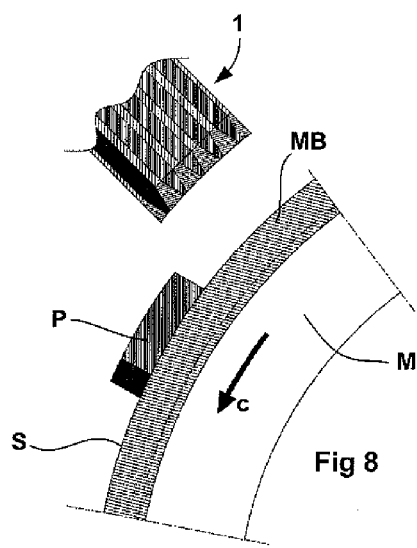

The next phase consists in moving the support M relative to the extrusion die in the circumferential direction c, as shown in FIG. 8. In practice, it will be found convenient to use the rotary drive means of the support M to bring about the relative movements in the circumferential direction, and to provide the extrusion die with a means of movement in the transverse direction (parallel to the direction OO') for the purpose of positioning the extrusion die in its exact position relative to the base strip MB, which position corresponds to the position of a tread element as already indicated earlier. The combination of these two means allows the extrusion die to be positioned precisely relative to the receiving surface S. Use will preferably be made of means controlled by an automatic system for controlling the motors which turn the support M and move the extrusion die 1 translationally.

The application cycle can then begin again by running the sequences in the order described above, and depositing all the blocks that will form the tread relief elements.

In order to improve the time required to produce one complete tread, it is possible to have multiple extrusion dies in the circumferential direction or in the transverse direction, provided the geometrical motifs of the tread are suitable for this configuration. In the same way, the number and shape of the extrusion dies can be adapted with advantage to the varying base motifs of the tread in such a way as to reduce the number of operations to be carried out.

Figure 9:
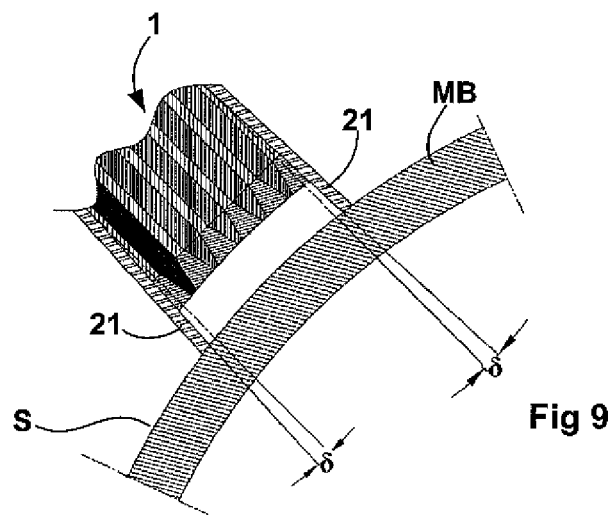
FIG. 9 shows a first variant of a device according to the invention.
Figure 10:
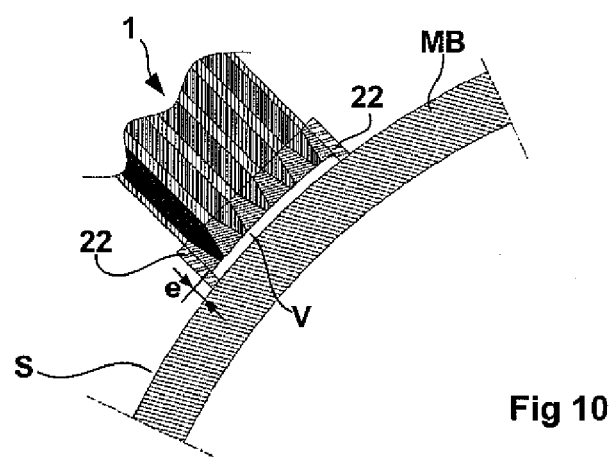
FIG. 10 shows a second variant of a device according to the invention.
Figure 11:
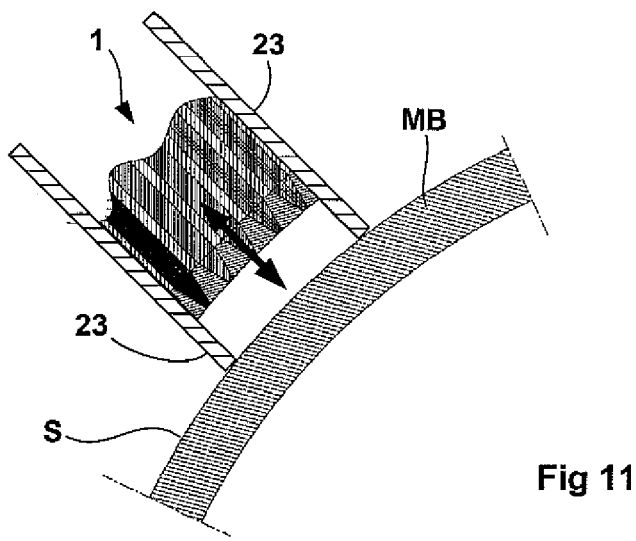
FIG. 11 shows a third variant of a device according to the invention.

FIGS. 9, 10 and 11 illustrate improvements that can be made without departing from the scope of the invention. A wall 21, 22, 23 surrounds the extrusion die. This wall is extendable in the outward flow direction of the compound beyond the plane formed by the extrusion nozzle orifices. In practice the wall extends radially between the plane formed by the extrusion nozzle orifices and the receiving surface S.

Several configurations are then possible.

A first configuration, illustrated in FIG. 9, corresponds to the case in which the extrusion die 1 is fixed relative to the wall 21. In this case the wall 21 may be in the shape of a cone whose generatrices pass through the curve corresponding essentially to the circumference of the surface Ps, and converge towards a point situated radially outside of the receiving surface S, forming an angle ▫ with respect to the receiving surface S. The wall may also be in the shape of a cylinder whose generatrices are oriented in a direction approximately perpendicular to the receiving surface S and also pass through the curve corresponding to the circumference of the surface Ps.

In the configuration shown in FIG. 9, the height of the wall 21 is approximately equal to the height h of the block of compound. In this case the space defined by the wall 21, the receiving surface S and the plane formed by the extrusion nozzle orifices is filled without radial movement of the extrusion die.

In a second configuration, shown in FIG. 10, the wall 22 remains fixed relative to the extrusion die 1, but at a height e less than the height h. In this case the radial movement of the extrusion die is retarded until the volume V corresponding to the volume bounded by the receiving surface S, the plane formed by the nozzle orifices, and the wall 22, is completely filled with the compounds ME1 and ME2. When the volume V is full, the extrusion die moves radially until the plane formed by the orifices is separated by the height h from the receiving surface.

A third configuration, illustrated in FIG. 11, consists in making the wall 23 movable relative to the extrusion die. In this case it is advantageous to make the shape of the wall 23 cylindrical so that the extrusion die can slide radially inside the internal space bounded by the wall 23. In this configuration the radially inner edge of the wall 23 stays in contact with the receiving surface S throughout the period of extrusion of the compounds. The extrusion die moves in the radial direction at the same rate as the space between the receiving surface, the wall 23 and the plane formed by the extrusion nozzle orifices is filled up. This particular arrangement results in a better surface quality around the sides of the block P.

Figure 12:
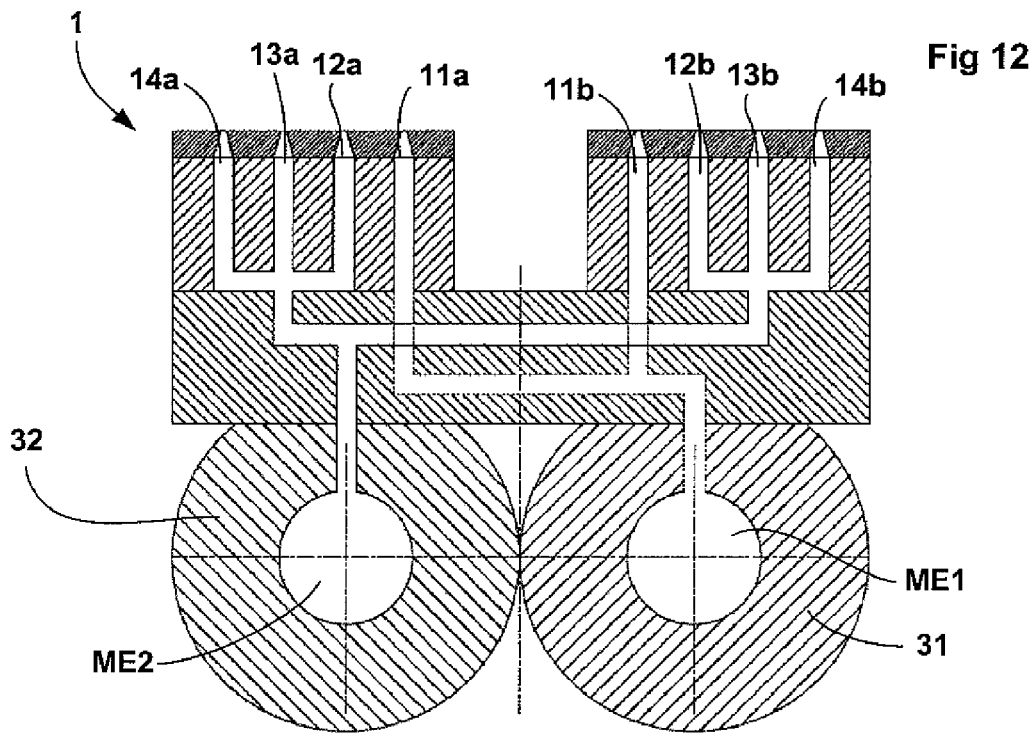
FIG. 12 is a diagrammatic view of the supply means and extrusion die.

FIG. 12 shows diagrammatically the connection between the compound supply means 31 and 32 and the extrusion die 1. In the case illustrated in FIG. 12, the extrusion die comprises eight extrusion nozzles arranged in two rows. One row formed by the nozzles 11a, 12a, 13a and 14a, and a second row formed by the nozzles 11b, 12b, 13b and 14b. The two rows are arranged one behind the other in the circumferential direction, and the illustration in FIG. 12 is a flattened-out view of the two rows of nozzles.

The device also includes two supply means 31 and 32, for the compounds ME1 and ME2, respectively. Each supply means is connected to at least one extrusion nozzle by distribution channels. The nozzles 11a and 11b are thus connected to the supply means 31 dedicated to compound ME1, and the nozzles 12a, 13a, 14a, 12b, 13b and 14b are connected to the supply means 32 dedicated to compound ME2.

The supply means may be of the screw extruder type or, preferably, positive-displacement extrusion means of the rubber pump type able to deliver a constant volumetric flow rate. This last option is particularly suited to this type of application because of the fact that the volume of the block P can be controlled with great accuracy.

Provision is also made to regulate the flow rates of the supply means 31 and 32 in such a way that the flow rates at the exits of the extrusion nozzles are approximately equal. In the particular case illustrated in FIG. 12 the flow rate of supply means 32 would therefore be three times greater than the flow rate of supply means 31.

Figure 13:
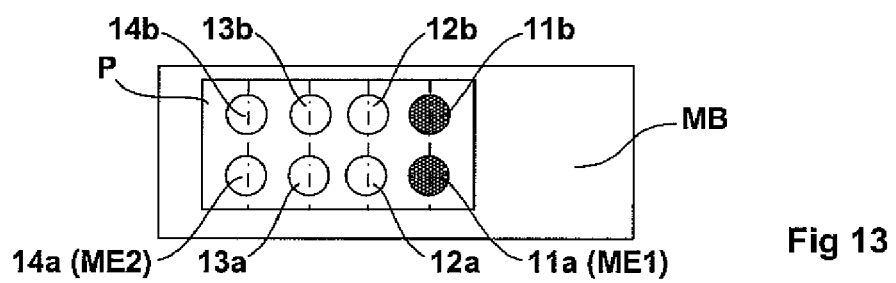
FIGS. 13, 14 and 15 illustrate examples of motifs that can be produced with a device according to the invention.

FIG. 13 shows a block P viewed in the radial direction and made with a device arranged in the configuration shown in FIG. 12. Each of the extrusion nozzles delivers a calibrated volume of compound corresponding approximately to ⅛ of the volume of the block P.

It goes without saying that the number of possible combinations concerning the number of nozzles or the number of different supply means is not limited, and depends essentially on the geometrical features of the blocks of compound which it is wished to produce and on the size of the individual nozzles and supply channels. Increasing the number of nozzles allows highly precise motifs to be created, and increasing the number of supply means allows the ideal quality of elastomeric compound to be delivered to each part of the tread block.

Figure 14:
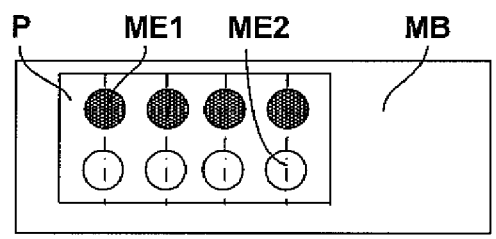
Figure 15:
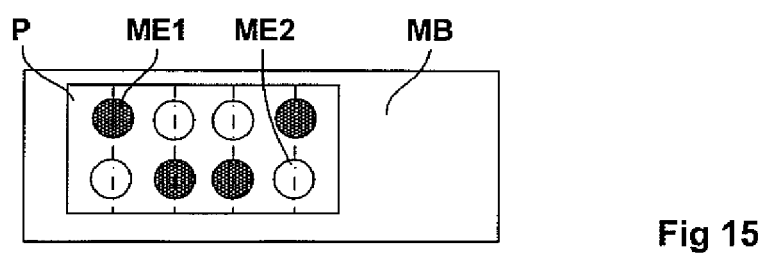

FIGS. 14 and 15 show other arrangements in the distribution of the two compounds ME1 and ME2 towards the eight nozzles, as illustrated in FIG. 12.

Figure 16:
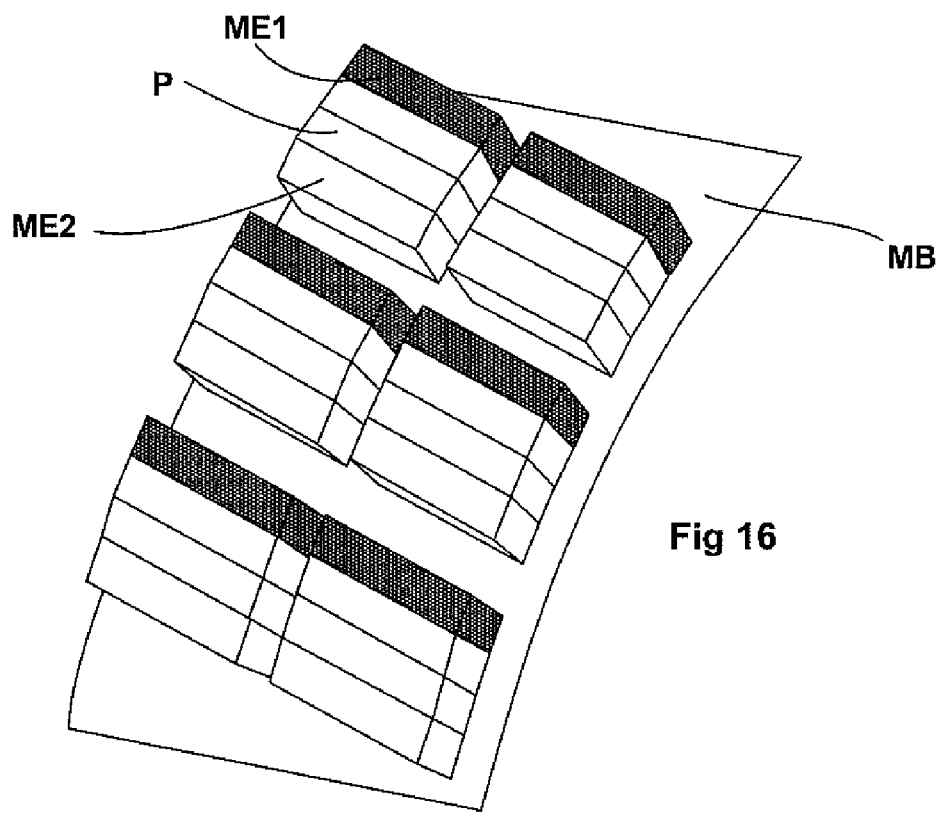
FIGS. 16 and 17 are perspective views of tread motifs produced with a device according to the invention.
Figure 17:
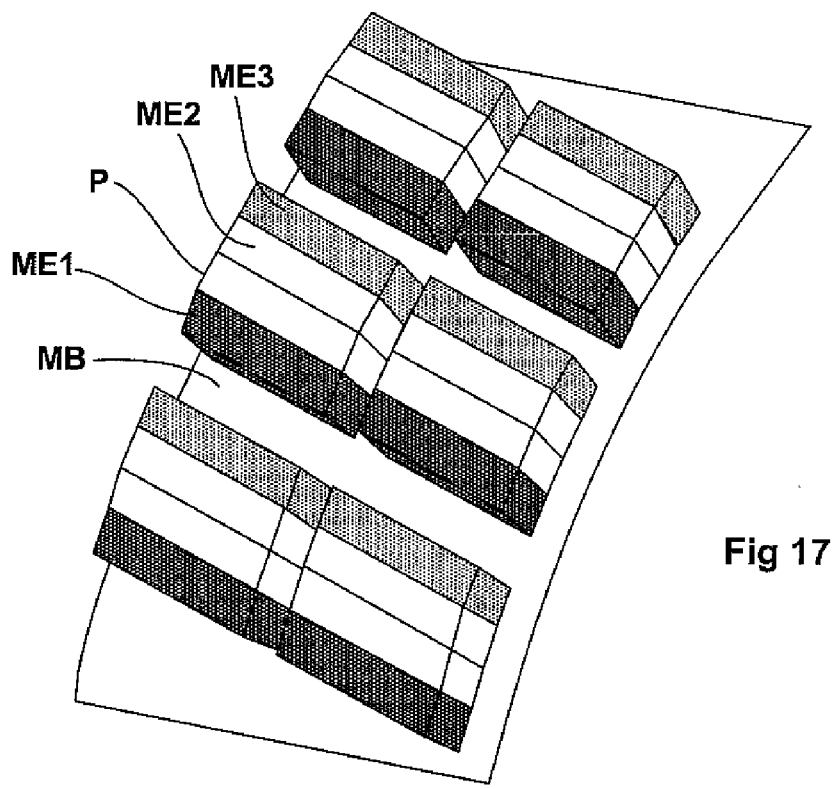

FIGS. 16 and 17 are diagrammatic perspective views of blocks of compound made with two (ME1, ME2) or three different compounds (ME1, ME2, ME3).

Once the blocks of compound have been deposited on the whole of the base strip, the green tire can be sent for curing.

For this purpose, said green tire is placed in a curing mould comprising a relief part designed to give the final shape to the tread and often known as the die. It is therefore of the first importance to position the tire precisely within the curing press, so that the relief parts of the liner are presented radially in line with the intervals between the blocks of compound of the green tire and each block of compound is placed radially in line with the tread element corresponding to it.

For this purpose, it will be advisable to provide precise indexing means on the assembly support M and on the curing press, alignment between which will ensure that the azimuth angle of the green tire in the press is correct. Such means are described for example in the publication WO 2006/069912, already cited.

The invention claimed is:

1. A device for manufacturing the tread of a tire, the tread comprising a plurality of relief tread elements of height h, whose radially outer surface is adapted to be in contact with the ground when the tire is rolling on the road surface, the device comprising:
    a rotary support suitable for supporting a base strip forming a receiving surface, an extrusion die comprising a plurality of extrusion nozzles whose outlet channels are oriented radially approximately perpendicular to the receiving surface;
    at least two compound supply means, each feeding into one or more separate extrusion nozzles; and
    means for positioning and moving the extrusion die relative to the receiving surface.

2. The device according to claim 1, wherein the base strip supporting assembly is formed by an approximately torus-shaped core on which the components forming the green tire have first been laid.

3. The device according to claim 1, wherein the base strip supporting assembly is formed by a cylinder on which the components designed to form the crown reinforcing structure of a tire have first been deposited.

4. The device according to claim 1, wherein the compound supply means comprise extruders.

5. The device according to claim 4, wherein said extruders are positive-displacement extruders.

6. The device according to claim 1, wherein the nozzle movement and positioning means are suitable for moving the extrusion die in a radial direction approximately perpendicular to the receiving surface.

7. The device according to claim 1, wherein the orifices of the extrusion nozzles are arranged in such a way that they are inscribed approximately within a planar area having approximately the shape of the area of a tread element designed to be in contact with the ground.

8. The device according to claim 1, wherein the outlet orifices of the extrusion nozzles have a smaller cross section than the cross section of the nozzles, to allow the beads of compound to break when the extrusion flow is interrupted.

9. The device according to claim 1, wherein a wall suitable for extending in the direction of the outlet flow of the compound beyond the plane formed by the injection nozzle orifices surrounds the extrusion die.

10. The device according to claim 9, wherein said wall is in the shape of a cylinder whose generatrices are oriented in the direction perpendicular to the receiving surface, and pass through a closed curve whose shape essentially corresponds to the circumference of the area of a tread element designed to be in contact with the ground.

11. The device according to claim 10, wherein said wall is movable relative to the extrusion die.

12. The device according to claim 9, wherein said wall is in the shape of a cone whose generatrices pass through a closed curve whose shape corresponds essentially to the circumference of the area of a tread element designed to be in contact with the ground, and essentially converge towards a radially outer point on the receiving surface, forming a given angle δ with respect to the direction perpendicular to the receiving surface.

13. The device according to claim 10, wherein said wall is fixed relative to the extrusion die.

14. The device according to claim 13, wherein the wall extends radially in the exit direction of the compound beyond the plane formed by the orifices of the extrusion nozzles by a given height, which is less than the height of the tread element.

15. A process for manufacturing the tread of a tire using a device according to claim 1, said tread comprising a plurality of relief tread elements, wherein the process comprises the steps of:
    depositing on a rotary support a base strip from an uncured elastomeric base compound, acting as a receiving surface; and
    depositing directly on said base strip, at predetermined locations corresponding essentially to the location of the tread elements, by extruding elastomeric compounds through extrusion nozzles, blocks of uncured compound designed to form a relief tread element, each of the blocks being composed of at least two uncured elastomeric compounds of differing qualities.

16. The manufacturing process according to claim 15, wherein, while the compounds are extruded through the extrusion nozzles, said extrusion die is moved perpendicular to the receiving surface, from a position the orifices of the extrusion nozzles are as close as possible to the receiving surface, to a position the extrusion nozzle orifices are at a predetermined distance from the receiving surface, and extrusion is stopped when this last position is reached.

17. The manufacturing process according to claim 16, wherein the flow rate of the supply means is regulated in such a way that the flow rates at the exit of each of the exit nozzles are approximately equal, so that each of the compounds comes flush with the radially outer face of the tread element.

18. The manufacturing process according to claim 17, wherein the movement of the extrusion die is continued past the predetermined distance until the beads of compound leaving the extrusion nozzle orifices break.

19. The manufacturing process according to claim 15, and also including the step of positioning the green tire in the curing press at a predetermined azimuth, so that the blocks of compound are situated radially facing their corresponding tread elements.

* * * * *